United States Patent
Liu et al.

(10) Patent No.: US 6,233,072 B1
(45) Date of Patent: May 15, 2001

(54) METHOD AND SYSTEM FOR RESTORING COINCIDENT LINE AND FACILITY FAILURES

(75) Inventors: Shoa-Kai Liu, Richardson; Glenn Wellbrock, Wylie, both of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/001,884

(22) Filed: Dec. 31, 1997

(51) Int. Cl.$^7$ .................................................. H04B 10/08
(52) U.S. Cl. ............................................. 359/110; 370/242
(58) Field of Search ........................................ 359/110, 117, 359/128, 137; 370/217, 221, 242, 245, 250

(56) References Cited

U.S. PATENT DOCUMENTS

| | | | |
|---|---|---|---|
| 5,218,465 | * 6/1993 | Lebby et al. | 359/110 |
| 5,299,293 | * 3/1994 | Mestdagh et al. | 359/110 |
| 5,345,446 | * 9/1994 | Hiller et al. | 370/358 |
| 5,715,074 | * 2/1998 | Netsu | 359/110 |
| 5,870,212 | * 2/1999 | Nathan et al. | 359/110 |
| 5,884,017 | * 3/1999 | Fee | 714/4 |
| 5,903,370 | * 5/1999 | Johnson | 359/117 |
| 5,933,258 | * 8/1999 | Flanagan et al. | 359/110 |
| 6,005,694 | * 12/1999 | Liu | 359/110 |
| 6,038,044 | * 3/2000 | Fee et al. | 359/110 |
| 6,078,596 | * 6/2000 | Wellbrock | 370/907 |
| 6,108,113 | * 8/2000 | Fee | 359/110 |
| 6,111,672 | * 8/2000 | Davis et al. | 359/110 |

\* cited by examiner

*Primary Examiner*—Kinfe-Michael Negash (57) ABSTRACT

The system and method of the present invention provide restoration of coincident line and facility failures. The system of the present invention includes light termination equipment (LTE) that is capable of detecting failures, determining the type of component that failed, determining which restoration facility to use based on the type of component that failed, and providing restoration. The system of the present invention also includes spare capacity for restoration, including protect channels and an optical restoration network. In addition, the system of the present invention includes an optical cross connect switch (OCCS) that is capable of switching electrical signals to the optical restoration network. The method of the present invention is involves detecting a failure, determining the type of component that failed, and sending an alarm to a centralized management center.

10 Claims, 7 Drawing Sheets

METHOD AND SYSTEM FOR RESTORING COINCIDENT LINE AND FACILITY FAILURES

BACKGROUND OF THE INVENTION

1. Field of the Invention

The present invention relates generally to the reliability and restoration of optical transmission systems.

2. Related Art

Telecommunications networks that carry telephone calls and data include interconnected sites or nodes that process calls and route data. Optical transmission lines or links interconnect the nodes.

High speed data is modulated on light waves which are transmitted through the optical network. Any type of data can be carried over an optical link, including but not limited to speech, data input into or retrieved by a computer or computer database, and any digital data. Fiber optic cables carry far greater amounts of digital data than conventional electrical cables. A single optical channel operating at approximately 10 Gigabits/second (Gb/s) and transmitting data according to a high-speed synchronous digital hierarchy standard, such as the SONET OC-192 protocol, carries a data rate equivalent to 129,024 voice calls.

Multiple links are often employed between nodes to increase communications capacity and to provide back-up in the event of partial failures. The set of links interconnecting a given pair of nodes is referred to as a "span."

Further bandwidth improvement can be achieved by sending multiple modulated lightwave carriers at different frequencies through a single fiber. This technique is known as wavelength division multiplexing (WDM). Optical systems using WDM require optical transmitters and receivers that operate at different light wave frequencies. The optical transmission line, connecting an optical transmitter and receiver, can propagate many light wave signals of different frequencies simultaneously. For example, at least sixteen OC-192 channels can be carried on a single fiber pair within the so-called "erbium band." A method and system for WDM is described in copending U.S. Application No. 08/923,461 entitled, "Method and System for Modular Multiplexing and Amplification in a Multi Channel Plan," filed by Viet Le on Sep. 4, 1997, assigned to the assignee of the present invention and incorporated by reference herein. Another optical system is described in copending U.S. application Ser. No. 08/672,808 entitled, "System and Method for Photonic Facility and Line Protection Switching," filed by John Fee on Jun. 28, 1996, assigned to the assignee of the present invention, and incorporated by reference herein.

Thus, fiber optic communications links, especially WDM communication links, carry vast amounts of information among distant sites to accomplish data, voice and image connectivity over a large geographical area. Optical transmission lines, transmitters and receivers, however, can fail. The failure of such components can have a substantial economic and practical impact on network users and network service providers. Therefore, in designing communications networks, special measures are practiced to assure utmost reliability of network components and survivability in the event of a failure.

Two types of failures experienced in a telecommunications network are line failures and module failures. A link in a telecommunications network has a transmitter and a receiver, which are also referred to as modules, and a line between the transmitter and receiver. Line failures include damage to the physical fiber and optical component failure, such as the malfunction of amplification equipment situated along the fiber optic cable. Line failures affect the communications line between two network sites. In contrast, a failure of the transmit or receive equipment, such as a laser diode transmitter, housed at either end of an optical communications link is referred to as a module failure. Both line failures and module failures may disable a link between two nodes.

In the event of either a line or module failure, restoration techniques are used to restore the traffic temporarily until the failure is repaired. The restoration approach varies depending on the failure. Traffic may be restored using line protect switching (LPS) or network restorative switching (NRS). If the traffic is restored using LPS, line terminating equipment (LTE) switches the signal from the failed channel to a spare channel within the LTE. If the traffic is restored using NRS, traffic is rerouted by switching the traffic to different routes through the network based on information stored in switch tables or a pre-planned algorithm stored in the switch or a dynamic algorithm which discovers alternate routes at the time of a failure.

LPS is performed strictly within a span. If one traffic-bearing link fails, then the LTE's at each end of the span switch to a protect channel or protect link reserved within the span.

In contrast to LPS, NRS involves rerouting of traffic through a set of nodes in a mesh network and may be used to recover even from failures wherein an entire span is disabled. A technique for accomplishing network restoration is taught by Grover in U.S. Pat. No. 4,956,835. NRS is a means by which spare capacity distributed across the many spans of a network can contribute to the survivability of a span failure. Thus, network survivability is improved while minimizing wasteful redundancy at each span.

LPS ensures resiliency to fiber cuts by employing a spare link, referred to as the protect channel, that normally does not carry traffic but may be used as a back-up should a traffic-bearing link fail. The protect channel is on a different path in order to reduce the likelihood that the protect channel will experience the same failure as the channel in use. Creating and maintaining idle spare capacity is costly. In order to reduce costs, one spare channel is available for restoration of multiple traffic carrying channels. This is called a 1:N or one-to-N protection scheme. When one protect channel is available to restore multiple traffic carrying channels, LPS cannot restore a failure of more than one link. LPS is primarily aimed at restoring single link failures and is implemented within LTE which is the local equipment that terminates the fiber optic cable. Since LPS is localized and simple, it is also very fast requiring only tens of milliseconds for restoring a failed communications link.

Because telecommunications networks include high capacity optical cables such as WDM, the networks are susceptible to failures that disable a very large number of channels and which cannot be restored by LPS alone causing potential high volumes of traffic loss and significant economic impact. Accordingly, NRS is used to restore optical networks. Exchanges have the capability to reroute traffic automatically using switch tables or an algorithm to other transmission paths in the network. Exchanges which have switching capability are connected to LTE at each site and to other transmission paths in the network. When a fiber cut or other major fiber failure occurs disabling a span including a large number of telecommunications links between two switching nodes, NRS is employed by the exchange to reroute the traffic through the restoration network to circumvent the failure until repairs are completed.

Line protect switching (LPS) and network restorative switching (NRS) have separate but complementary roles in a modem network design. The LPS can quickly restore simple localized failures without having to invoke the more complex NRS. In many applications, the LPS can switch traffic without causing any significant interruption to traffic. The NRS can handle network problems of a larger scope.

However, current LPS techniques do not allow for the restoration of failures that involve more than one channel. Although current LPS reroutes the traffic to a spare protect channel, only one protect channel is available to restore multiple channels. Therefore, if the protect channel is in use restoring one link failure, subsequent failures cannot be restored using LPS.

In addition, current NRS does not allow for restoration by components in the optical network via a restoration network.

SUMMARY OF THE INVENTION

In the present invention, line terminal equipment (LTE) sends an alarm to an optical cross connect switch (OCCS) controller to restore a failure when a protect channel is in use. The OCCS controller controls multiple optical cross connect switches (OCCSs) and addresses alarms by determining whether they can be restored. An OCCS is an optical switching device that interconnects numerous optical transmission lines to an optical restoration network. An optical restoration network includes complete restorative spans of telecommunications links connected by the OCCSs.

The system of the present invention includes LTE, an OCCS, and an OCCS controller that are capable of restoring a second failure within one telecommunications cable. The LTE of the present invention can reroute optical and electrical signals to compensate for a failed component such as an optical transmitter, receiver, or transmission line. The present invention includes a protect, or spare, optical transmission line with which to replace a corresponding failed channel. The LTE can switch to the protect channel when a channel fails due to either line or module failure. The LTE of the present invention is also capable of determining the facility type of channel failures and sending an alarm to the OCCS to reroute failure of a line via the optical restoration network if one of the two failures is a line failure.

The OCCS of the present invention can reroute optical and electrical signals to compensate for a channel that experiences line failure. However, the OCCS cannot restore a channel that experiences module failure. As a result, when two coincident failures, a line and facility failure, occur the present invention restores the line failure via the first OCCS switching and restores the module failure using the protect channel.

The OCCS controller of the present invention is capable of receiving the alarm from the LTE notifying of a failure and sending a request to the OCCS to restore a failed line through the optical restoration network.

The method of restoring coincident line and facility failures is employed when a subsequent failure is detected. The subsequent failure is analyzed to determine the facility type of the failure. If the subsequent failure is due to a line failure, an alarm is sent to the OCCS and the subsequent failure is restored via the optical restoration network. If the subsequent failure is due to a module failure, the facility type of the previous failure is determined. If the facility type of the previous failure is failure of a line, an alarm is sent to the OCCS and the previous failure is restored via the optical restoration network. If the facility type of the previous failure is also failure of a module, an alarm is sent to the network management center indicating that a non-restorable failure has occurred.

Further features and advantages of the invention, as well as the structure and operation of various embodiments of the invention, are described in detail below with reference to the accompanying drawings.

BRIEF DESCRIPTION OF THE FIGURES

The present invention is described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Table of Contents 1.0 Overview
2.0 Terminology
3.0 Example Optical Restoration Environment
4.0 Optical Cross Connect Network
5.0 Restoration of Coincident Line Failures 1.0 Overview The present invention provides a system and method of restoring subsequent failures within a telecommunications network. A system and method are provided for sending an alarm from optical line terminating equipment (LTE) to an optical cross connect switch (OCCS) controller. The OCCS controller addresses the alarm by determining whether to restore the failure by sending a command to an optical cross connect switch (OCCS). The OCCS controller can identify the facility type of the subsequent failure and retrieve the facility type of previous failures in order to ensure that a protect or spare channel is made available to restore a module failure in the event restoration of a module failure is needed.

The system and method of the present invention is illustrated as operating in an exemplary telecommunications network that carries digitized voice between two individuals speaking on telephones. The present invention is further illustrated within an exemplary optical cross connect network that is within the telecommunications network. However, the present invention is not limited to these environments and may be used in any network that requires restoration such as an X.25 network transmitting data.

2.0 Terminology

Provided below is a brief description of the terminology used within this document. Additional description is provided in the following sections along with exemplary implementations and embodiments. However, the present invention is not limited to the exemplary implementations and embodiments provided.

A "telecommunications network" is a network that carries information. The information may be digitized voice that is carried between two telephones or data that is carried between two computers. Several examples of telecommunications networks follow in the description of FIG. 1, however, a telecommunications network is not limited to these examples.

A telecommunications network may include termination equipment, optical cross connect switches, and optical cross connect switch controllers. "Termination equipment" is equipment that terminates a cable within a telecommunications network and typically provides modulation and demodulation functionality. Exemplary termination equipment is light termination equipment described further with respect to FIG. 1 and FIG. 2.

An "optical cross connect switch" provides switching functionality within an optical network. An optical network is a network within a telecommunications network that is comprised of transmission facilities that carry optical signals. An optical network may provide high speed transmission and be capable of carrying a significant amount of data.

"Optical cross connect switch controllers" accept information from termination equipment and use the information to provide commands to optical cross connect switches. Optical cross connect switch controllers are processors with access to memory via a separate or an associated memory storage device such as a hard drive, disk, and/or standalone database. However, an optical cross connect switch controller is not limited to these embodiments and may be any capability to control one or more optical cross connect switches. More detail is given about optical cross connect switch controllers below.

A "failure" is a component that experiences operational difficulties within the telecommunications network. A disabling event causes the failure of one or more components within the telecommunications network. If multiple failures occur, after the first failure occurs, a later failure is referred to as a "subsequent failure" and the first failure or a previous failure is referred to as a "previous failure."

Components within the telecommunications network can be grouped into types of components, such as lines and modules. As used herein, the "failed facility type" characterizes a failed component as either a "line failure" or a "module failure." Likewise, the "previous failed facility type" as used herein may be either a "line failure" or a "module failure."

3.0 Example Optical Restoration Environment

Figure 1:
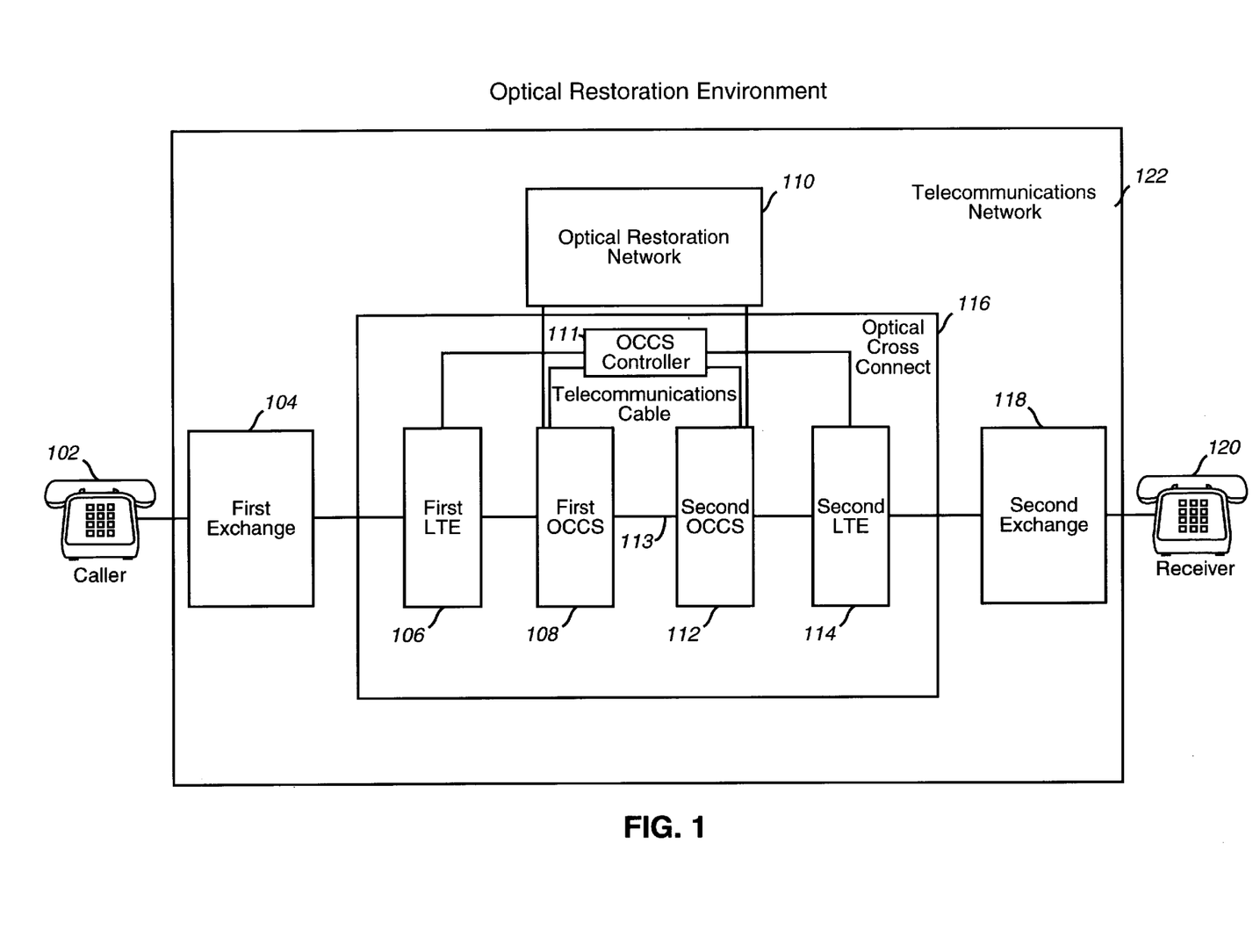
FIG. 1 is a block diagram of an optical restoration environment according to one embodiment of the present invention.

FIG. 1 is a block diagram of an optical restoration environment 101 according to one embodiment of the present invention. Optical restoration environment 101 provides connectivity and switching capability for telecommunications services. An exemplary use for the optical restoration environment 101 is to restore channels in a network carrying a call placed by a caller on a first telephone 102 to a receiver on a second telephone 120. However, optical restoration environment 101 may be used to restore any voice or data traffic carried on a network.

Optical restoration environment 101 includes a first telephone 102 used by a caller that is interconnected to a second telephone 120 used by a receiver via a telecommunications network 122. Telecommunications network 122 includes a first exchange 104, an optical cross connect 1 16, a second exchange 118, and an optical restoration network 110.

The first telephone 102 is connected to a first exchange 104 within the telecommunications network 122. The first exchange 104 provides switching functionality to connect to the appropriate telecommunications channel to establish service to the second telephone 120. The first exchange 104 is connected to optical cross connect 116 which is equipment that provides termination and optical switching for channels carried on an optical telecommunications cable 113. In addition, the optical cross connect 116 is connected to a second exchange 118 in order to establish connectivity via a channel link between the first telephone 102 and the second telephone 120. The second exchange 118 is connected to the second telephone 120 to provide switching and connectivity to second telephone 120.

According to the present invention, the optical cross connect 116 is also connected to the optical restoration network 110 to provide restoration in the event of channel or cable failure. The optical cross connect 116 includes a first light termination equipment (LTE) 106 and second LTE 114. The optical cross connect 116 also includes a first optical cross connect switch (OCCS) 108 and a second OCCS 112. The first exchange 104 is connected to the first LTE 106. The first LTE 106 handles call termination, data rate conversion, and light protect switching (LPS) restoration functions. The first LTE 106 is connected to the first OCCS 108. The first OCCS 108 provides optical switching capability needed for network restoration switching (NRS) via the optical restoration network 110. The first OCCS 108 is connected to a second OCCS 112 for connectivity to the second telephone 120. The path between the first OCCS 108 and the second OCCS 112 is illustrative only. As would be apparent to a person skilled in the art, additional intermediate optical cross-connect switches and filters can be added in a point-to-point circuit or any network topology (eg. ring, mesh). In addition, the optical cross connect 116 includes an optical cross connect switch (OCCS) controller 111 which is connected to the first LTE 106, the second LTE 114, the first OCCS 108, and the second OCCS 112 to provide control and allow for rerouting via the optical restoration network 110.

The first telephone 102 and second telephone 120 are used to place and receive calls via the telecommunications network 122. The first telephone 102 and second telephone 120 are exemplary and may be any equipment that can be used to initiate or receive a call via a telecommunications network 122. Examples of other types of equipment that can be used to initiate and receive a call via the telecommunications network 122 are a wireless telephone, a pager, a personal computer and a modem.

The first exchange 104 and second exchange 118 are exemplary exchanges within the telecommunications network 122. The first exchange 104 and second exchange 118 provide switching capability to route a call via a telecommunications link that interconnects to the caller's destination. The first exchange 104 and second exchange 118 may be implemented using DMS-250 switches manufactured by Nortel.

The telecommunications network 122 may comprise many telecommunications networks including local exchange networks and interexchange networks. Typically equipment used to initiate and receive a call, such as first telephone 102 and second telephone 120, is interconnected to an exchange within a local exchange network. Therefore, exemplary first exchange 102 and second exchange 118 are within a local exchange network. A local exchange network comprises switches and termination equipment within a localized area. An example of a local exchange network is a local telephone operating company network such as Bell Atlantic. If the caller is calling long distance, the local exchange network will send the call to an interexchange switch in an interexchange network.

Similar to the local exchange network, an interexchange network comprises a plurality of switches, also referred to as exchanges, that are located throughout a geographic area. However, interexchange networks typically comprise of switches throughout a large geographic area to process long-distance telephone calls. For example, a national interexchange network comprises switches located throughout the nation. When a call is routed to the interexchange network, it may be routed to one or more switches within the interexchange network.

Optical cross connect equipment, such as exemplary optical cross connect 116, is connected to the telecommunications cables within telecommunications network 122, such as exemplary telecommunications cable 113 between the first exchange 104 and second exchange 118. The optical cross connect 116 provides termination and switching functionality for signals carried on optical telecommunication cable 113.

The optical cross connect 116 includes a first LTE 106 and a second LTE 114. The first LTE 106 and second LTE 114 terminate the telecommunications cable 113. The first LTE 106 and second LTE 114 will be described in further detail with respect to FIG. 2.

The optical cross connect 116 includes a first OCCS 108 and a second OCCS 112. The first OCCS 108 and second OCCS 112 can by any type of optical switch. For example, the first OCCS 108 and second OCCS 112 may be implemented using combinations of an integrated lithium niobate directional-coupler type switch. Other types of suitable optical switching technology include switches based on thermo-optic effect in polymer waveguides or silica glass, semiconductor amplification, piezo movement, and integrated indium phosphide. In addition, although a single first OCCS 108 and second OCCS 112 are shown for clarity, multiple discrete switches and couplers can be used to perform equivalent multiple-port optical switching.

The OCCS reroutes traffic based on an algorithm. An exemplary algorithm is the Real-Time Multiple Wavelength Routing (RMWR) algorithm which uses collected data to select an alternate path based on wavelength information stored in a centralized database. RMWR is described in further detail copending U.S. application Ser. No. 08/580,608 entitled, "Restoration System for an Optical Telecommunications Network" filed by Shoa-Kai Liu on Dec. 29, 1995, assigned to the assignee of the present invention, and incorporated by reference herein. An additional description of an algorithm used for rerouting traffic is described in U.S. Pat. No. 4,956,835 entitled, "Method and Apparatus for Self-Restoring and Self-Provisioning Communication Networks" filed by Grover on Sep. 11, 1990 which is incorporated by reference herein.

The first OCCS 108 and second OCCS 112 are connected to a telecommunications cable 113. The telecommunications cable 113 includes bidirectional optical fibers, line repeaters, and/or amplifiers. Alternatively, the telecommunications cable 113 may include long-haul, single mode fiber. The telecommunications cable 113 is not linked to these components and may be any transmission medium cable of carrying signals in a telecommunications network.

The optical restoration network 110 is connected to the first OCCS 108 and the second OCCS 112. The optical restoration network 110 comprises spare optical termination and cross connect equipment for restoration of traffic if the optical cross connect 116 in use fails. The optical restoration network 110 includes a plurality of spare components including LTEs, such as the first LTE 106 and the second LTE 114, OCCSs, such as the first OCCS 108 and second OCCS 112, and telecommunications cables, such as telecommunications cable 113.

The OCCS controller 114 is connected to the first LTE 106, the second LTE 114, the first OCCS 108, and the second OCCS 112. The OCCS controller 111 can be connected to any number of LTE and OCCSs. The OCCS controller 111 receives information from the first LTE 106 and the second LTE 114. If the information indicates that traffic must be rerouted, the OCCS controller 111 sends commands to the first OCCS 108 to reroute electrical signals via the optical restoration network 110. The OCCS controller 111 may be implemented using any processor or a plurality of distributed processors that are coordinated by a communication link not shown.

4.0 Optical Cross Connect Network

Figure 2:
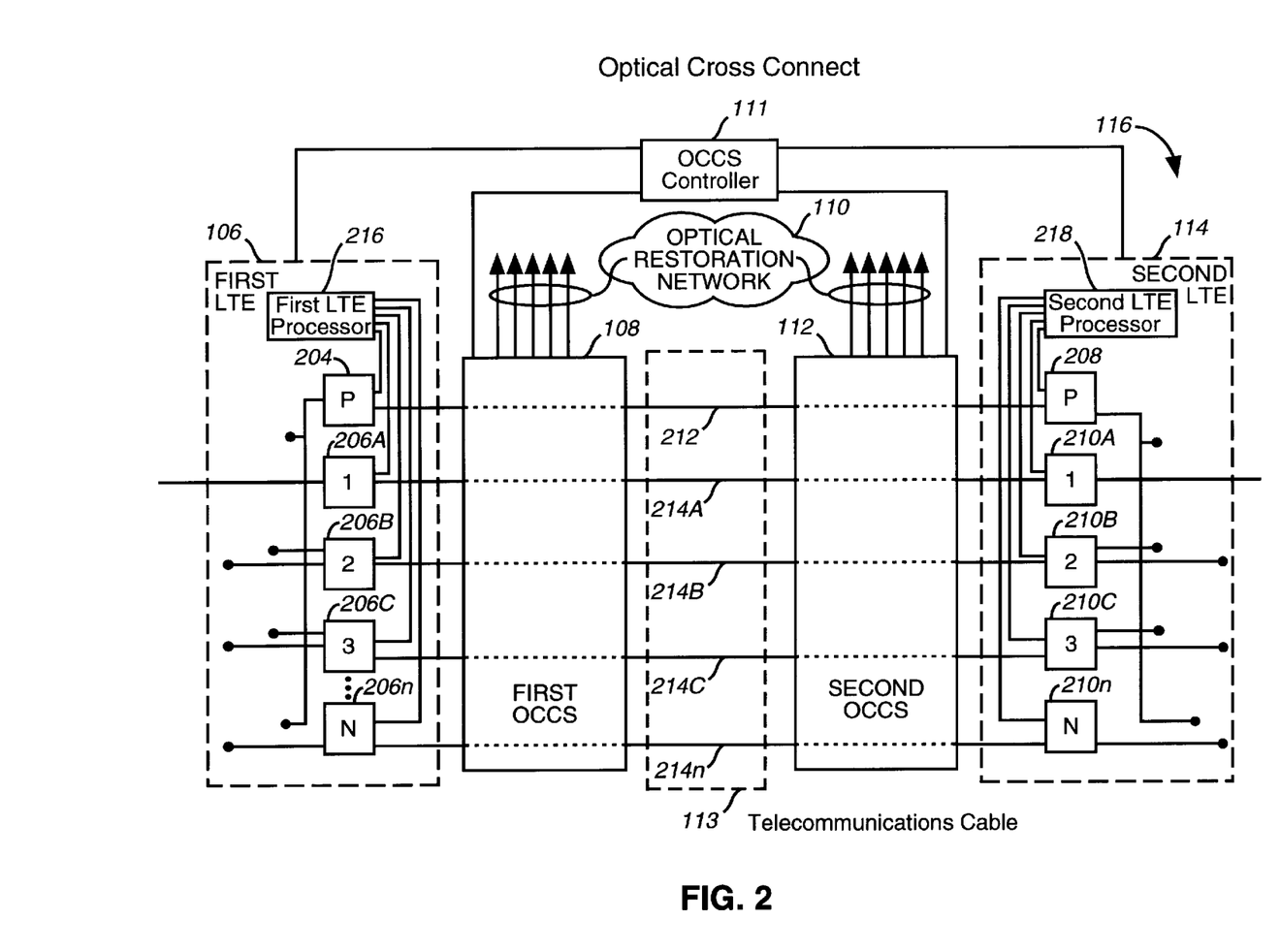
FIG. 2 is a block diagram of an optical cross connect according to one embodiment of the present invention.

FIG. 2 is a block diagram of optical cross connect 116. Illustrated within the first LTE 106 and the second LTE 114 are the transmitters, 206A, 206B, 206C, . . . 206n, and the receivers, 210A, 210B, 210C, . . . 210n. Each one of the transmitters 206 is connected to a corresponding one of the receivers 210 via one of multiple channels 214A, 214B, 214C, . . . 214n within the telecommunications cable 113. Also within telecommunications cable 113 is a protect channel 212. The protect channel 212 is spare and is used for restoration if one of the channels 214 in use fails. The protect channel 212 is connected to a transmitter 204 within the first LTE 106 and a receiver 208 within the second LTE 114.

Although, both first LTE 106 and second LTE 114 have transmitters and receivers, transmitters 206 are shown only in the first LTE 106 and receivers 210 are shown only in the second LTE 114 for clarity. The transmitters and receivers are typically in an array made up of pairs of transmitters and receivers. In FIG. 2, each of the transmitters 206 would actually be a transmit and receive pair.

Each of the transmitters 206 transmit a signal carrying a digitized voice of a caller or any other data that was sent by equipment that originated a call, which is shown in FIG. 1 as exemplary first telephone 102. In one embodiment, the transmitters 206 are modulated lasers, such as directly modulated semiconductor laser diodes or externally modulated lasers. Each one of the transmitters 206 is connected to one of the multiple channels 214 within the telecommunications cable 113. The transmitters 206 transmit signals via the channels 214 within the telecommunications cable 113 to the receivers 210.

Similar to the transmitters 206, each one of the receivers 210 is connected to one of the multiple channels 214 within telecommunications cable 113 to receive signals from the corresponding one of the transmitters 206. The receivers 210 demodulate electrical signals from the light wave signal of the corresponding carrier frequency. Receivers 210 can be optical detectors or any equipment that can receive and transduce the transmitted signal.

In one example, each one of the channels 214 within telecommunications cable 113 is an optical channel within a fiber optic cable. The signals within an optical fiber are modulated using various frequencies which allow one fiber optic cable to carry a large number of channels. As mentioned above, this technique is referred to as wavelength division multiplexing (WDM). Example transmitters, receivers, and fiber optic cables and WDM are described in further detail in the above referenced application No. 08/923,461. In addition, transmitters, receivers, and fiber optic cables are described in the above-referenced '808 application. Further description of transmitters, receivers, and fiber optic cables is given by Daniel Minoli in chapter 7 of his book entitled, "Telecommunications Technology Handbook," Artech House, Inc. (1991) incorporated herein by reference.

Each of the channels 214 (also referred to as traffic carrying channels) carry normal non-restoration traffic within the telecommunications cable 113. The protect channel 212 is an optical channel within a fiber optic cable that is achieved by modulating a signal at a particular frequency. Also, the transmitter 204 that transmits via the protect channel 212 is a modulated laser like the transmitters 206 on the other channels 214. The transmitter 204 may be implemented using the same technologies as the transmitters 206 on the other channels 214 within the telecommunications cable 113. Like the receivers 210 that receive signals from the traffic carrying channels 214, the receiver 208 on the protect channel 212 demodulates the received signal. The receiver 208 may be implemented with the same technologies as the receivers 210 that receive signals from the other channels 214.

Both the first LTE 106 and the second LTE 114 have processors referred to as the first LTE processor 216 and the second LTE processor 218, respectively. The first LTE processor 216 is connected to each of the transmitters 206 to obtain information about whether each of the transmitters 206 is in use and whether the transmitters 206 are experiencing operational difficulties. Similarly, the second LTE processor 218 is connected to each of the receivers 210 to obtain information about whether each of the receivers 210 is in use and whether the receivers 210 are experiencing operational difficulties. The first LTE processor 216 and the second LTE processor 218 are connected to the protect channel transmitter 204 and protect channel receiver 208, respectively to obtain information about whether the protect channel 212 is in use and whether the protect channel is experiencing any operational difficulties. The first LTE processor 216 and second LTE processor 218 are any processor that can obtain information from and coordinate among the components with a first LTE 106 or second LTE 114.

5.0 Restoration of Coincident Failures

Figure 3:
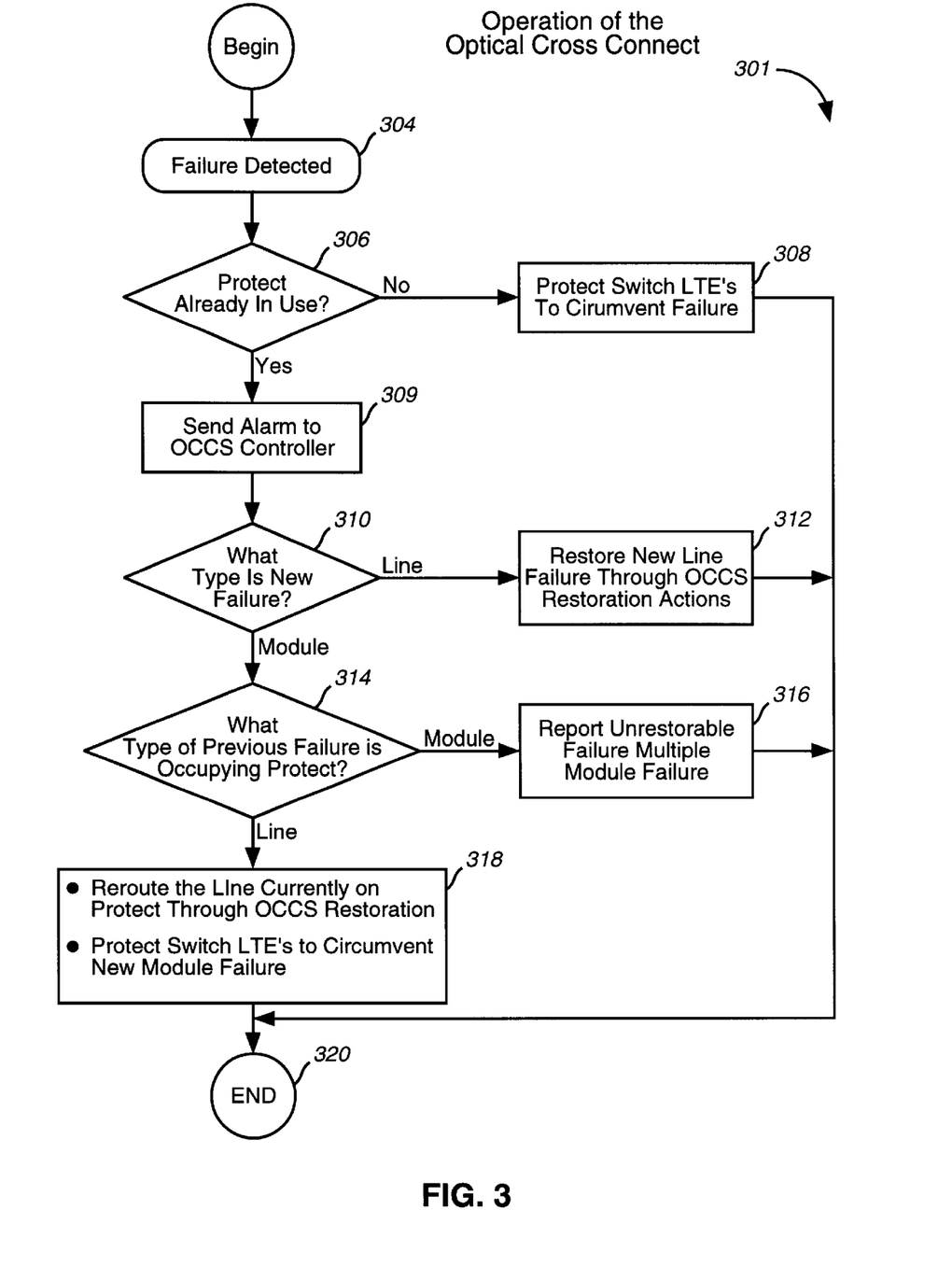
FIG. 3 is a flowchart of the operation of the optical cross connect according to one embodiment of the present invention.

FIG. 3 illustrates a restoration process 301 according to the present invention. FIG. 3 will be described with reference to the example of FIGS. 4A, 4B, and 4C which illustrate various failures of channels 214 within telecommunications cable 113.

In step 304, either the first LTE 106 or the second LTE 114 detects a failure 404 in channel 214A. The first LTE 106 may detect a failed transmitted 206. A single optical detector at the second LTE 114 can detect a failure and send a fault signal to the second LTE processor 210 within the second LTE 114. Failure 404 may be detected electrically at first LTE 106 using conventional loss of signal techniques. Alternatively, failures may be detected by multiple optical detectors (not shown) along the channels 214. If an optical detector detects a failure on one of the channels 214, the optical detector will send a fault signal to the first LTE 106. Various methods of optical failure detection including optical and electrical detection techniques can be used including those that are described further in co-pending U.S. application Ser. No. 08/580,391 entitled, "Method and System for Detecting Optical Faults Within the Optical Domain of a Fiber Communication Network," filed by Shoa-Kai Liu on Dec. 28, 1995 which is assigned to the assignee of the present invention and is incorporated by reference herein.

Figure 4A:
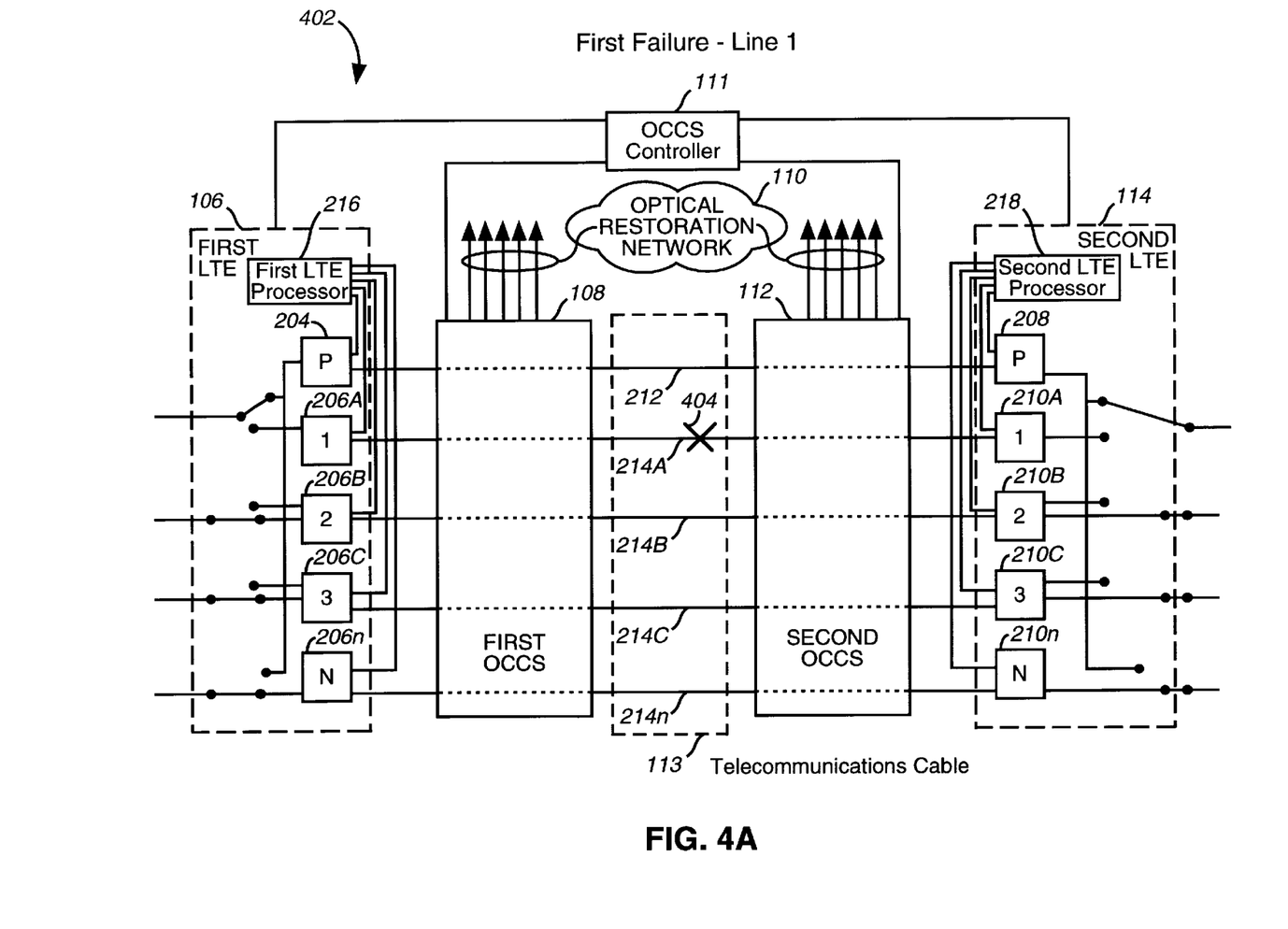
FIG. 4A is a block diagram of the optical cross connect illustrating the use of a protect channel to restore a single line failure according to one embodiment of the present invention.

In step 306, either the first LTE 106 or the second LTE 114, whichever detected the failure, determines whether the protect channel 212 is in use. A determination of whether the protect channel 212 is in use is made to evaluate whether the protect channel 212 is available to restore the detected failure. FIG. 4A illustrates a single line failure in which the protect channel is available to restore the detected failure 404. If the protect channel 212 is not in use, the protect channel 212 is available to restore the detected failure 404 and the first LTE 106 proceeds to step 308. If the protect channel 212 is in use, the first LTE 106 proceeds to step 309 and sends an alarm to the OCCS controller 111.

In step 308, traffic is restored by the first LTE 106 on the protect channel 212. FIG. 4A illustrates using the protect channel 212 to circumvent the single line failure 404. The incoming line to the first channel 214A is interconnected to the protect channel transmitter 204 rather than the first channel transmitter 206A. The protect channel 212 provides connectivity that circumvents the failed channel 214A. The protect channel receiver 208 within the second LTE 114 receives the signal and sends the signal to the next component that will receive the signal and provide connectivity to the final destination, for example the second exchange 118 as shown in FIG. 1.

Figure 4B:
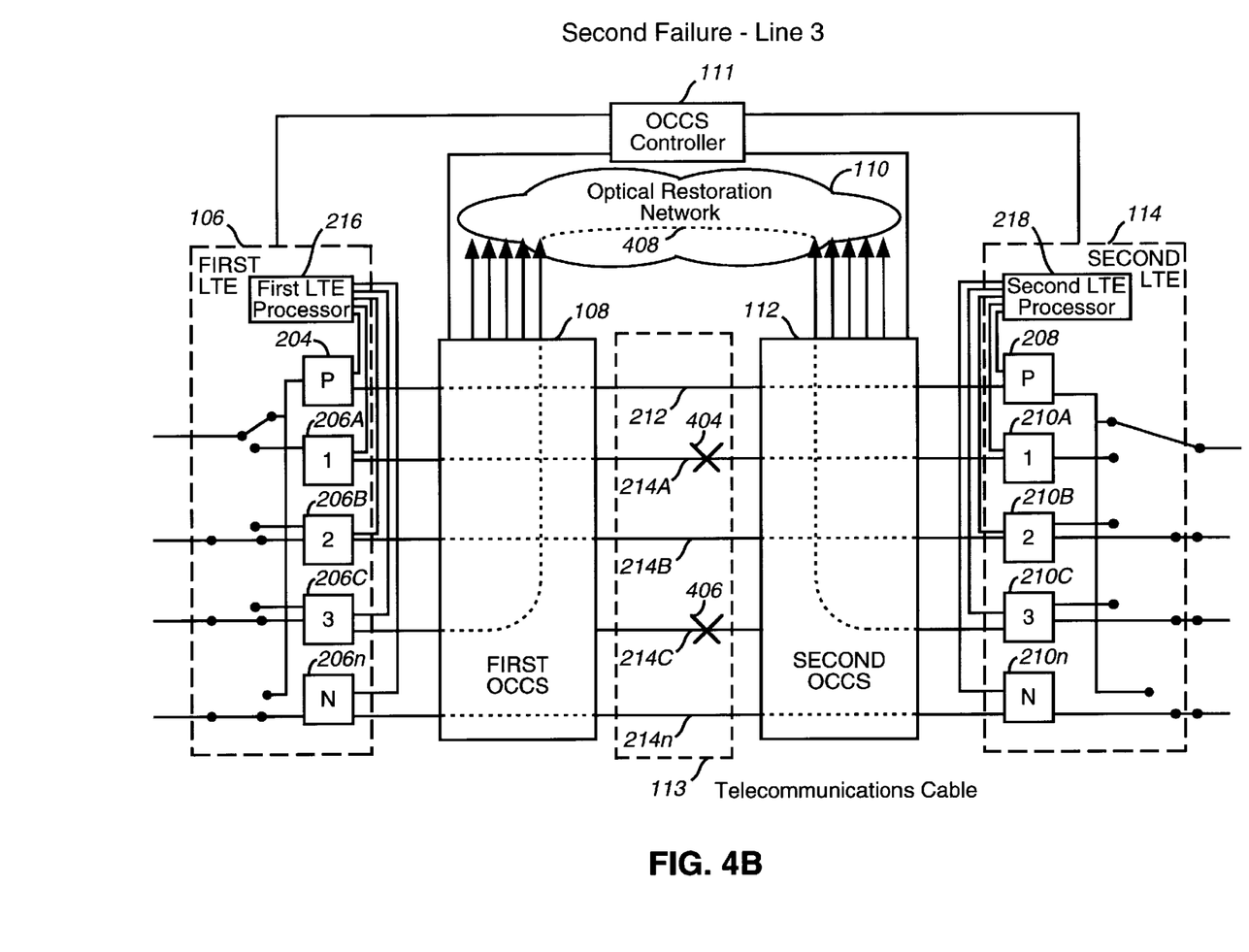
FIG. 4B is a block diagram of the optical cross connect illustrating the response to a first and second line failure according to one embodiment of the present invention.
Figure 4C:
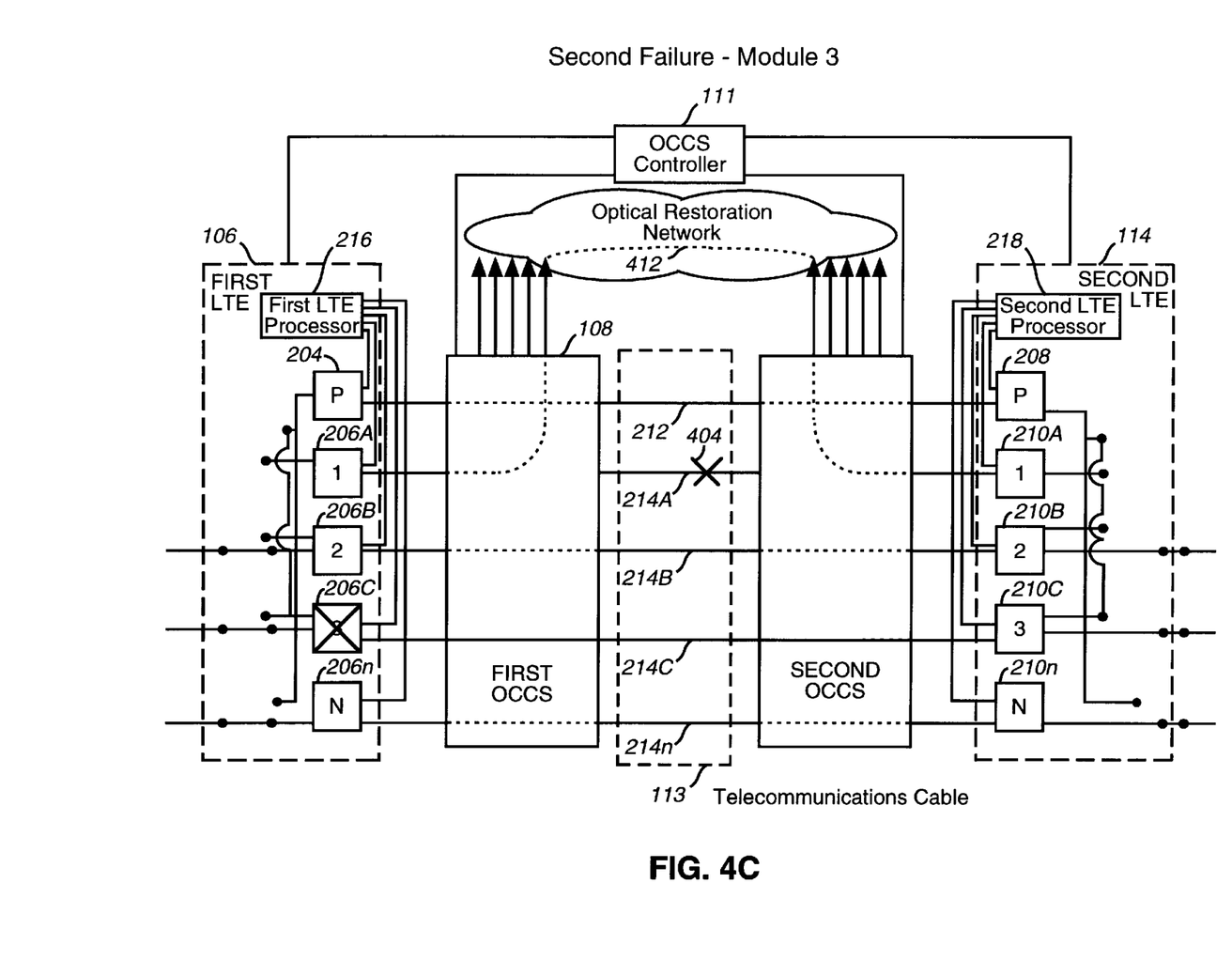
FIG. 4C is a block diagram of the optical cross connect illustrating the response to a second module failure and first line failure according to one embodiment of the present invention.

FIGS. 4B and 4C illustrate multiple failures within telecommunications cable 113. If the protect channel 212 is in use, step 309 is performed to restore the detected failure. In step 309, the first LTE 106 or second LTE 114, whichever detected failure 404, sends and alarm to the OCCS controller 111. The information is sent by first LTE processor 216 or the second LTE processor 218. The first LTE processor 216 obtains the information from one of the transmitters 206. The second LTE processor 218 obtains the information from one of the receivers 210. The first LTE processor 216 and the second LTE processor 218 send the OCCS controller 111 information including whether the failure is a line failure or a module failure.

A failure on a channel 214 may be either a line failure or a module failure. A line failure is a failure of the channel 214 between the transmitter 206 and the receiver 210. FIG. 4B illustrates a first line failure 404 and a second line failure 406. Transmitters 206 and receivers 210 are also referred to as modules. A module failure is a failure of either a transmitter 206 or a receiver 210. FIG. 4C illustrates a first line failure 404 and a second module failure 410.

The first LTE processor 216 can determine if the transmitters 206 (or associated receivers or modules not shown but collocated with each of the transmitters 206 within the first LTE 106) fail. The second LTE processor 218 can determine if the receivers 210 (or associated transmitters or modules not shown but collocated with each of the receivers 210 within the second LTE 114) fail. If a transmitter, receiver, or other module fails, a module failure, also referred to as an equipment failure has occurred. Both the first LTE processors 216 and the second LTE processor 218 can report to the OCCS controller 111 that a module failure occurred. If a line failure occurs, the photodetector within the one of the receivers 210 that corresponds to the failed channel will detect a loss of light and the second LTE processor 218 can determine that a line failure occurred and report that a line failure occurred to the OCCS controller 111.

If a line failure occurs, two alarms may be sent to the OCCS controller 111. A photodiode within the second LTE 114 may detect a failure by detecting a loss of light and a receiver associated with transmitter 206 may detect a loss of communication with the second LTE 114. If both the first LTE 106 and the second LTE 114 send alarms for the same failure, the OCCS controller 111 can coordinate the alarms and determine that one failure occurred.

In step 310, the OCCS controller 111 identifies the type of the new failure using the information received from the first LTE 106 and/or the second LTE 114. The type of failure, either line or module, is determined in order to determine how to restore the failure. According to the present invention, line failures, such as first line failure 404 and second line failure 406, are restored either on the protect channel 212 or via the optical restoration network 110. The first LTE 106 restores a single module failure 410 on a protect channel 212 as described earlier with respect to steps 306 and 308. If multiple failures occur and the protect channel 212 capacity is insufficient to restore all of the failures, in step 310 the type of failure is determined in order to ensure that if the multiple failures include a module failure 410 and line failures, such as first line failure 404 and second line failure 406, the module failure is restored on the protect channel 212 and the line failures are restored on the optical restoration network 110.

If the type of new failure is a line failure, the OCCS controller 111 proceeds to step 312 to provide restoration through OCCS restoration actions using the optical restoration network 110. If the type of new failure is a module failure, the OCCS controller 111 proceeds to step 314 to obtain additional information in order to determine how to restore the failure.

In step 312, the OCCS controller 111 sends a command to the first OCCS 108 to restore the new failure. If the new failure is a second line failure 406 as illustrated in FIG. 4B, then the second line failure 406 can be restored on the optical restoration network 110. Determining the facility type and rerouting the previous failure 404 are unnecessary because the second line failure 406 can be restored without affecting the previous failure 404.

The second line failure 406 is restored by the OCCS controller 111 sending an alarm to the first OCCS 108. When the first OCCS 108 receives the alarm, the first OCCS 108 switches to reroute the optical electrical signals that were to be carried on the failed channel 214C via the optical restoration network 110. The optical electrical signals take a path from the transmitter 206C within the first LTE 106 through the first OCCS 108 through a path 408 in optical restoration network 110 to the second OCCS 114 which is connected to the receiver 210C within the second LTE 114 that receives the signal. When the second line failure 406 is repaired, the first OCCS 108 will reroute the electrical signals back to channel 214C.

In step 314, the OCCS controller 111 retrieves the type of previous failure. The OCCS controller 111 retrieves the information from the first LTE processor 216 or the second LTE processor 218 that indicates whether the previous failure was a line failure or a module failure. The type of the previous failure indicates the type of failure that is being restored using the protect channel. As mentioned previously, although line failures, such as first line failure 404 and second line failure 406 typically can be restored on a protect channel 212 or via an optical restoration network 110, a single module failure 410 often can only be restored on a protect channel 212. Therefore, if the new failure is a module failure 410 as was determined in step 312 and is illustrated in FIG. 4C, then determining the type of the previous failure 404 indicates whether the restoration in use for the previous failure 404 can be modified to accommodate the new failure 410.

If the type of previous failure is a line failure as is illustrated in FIG. 4C, then the OCCS controller 111 proceeds to step 318 to restore both the previous failure 404 and the new failure 410. If the type of previous failure is a module failure which is not shown, then OCCS controller 111 proceeds to step 316 to send an alarm because neither the OCCS controller 111 or the first OCCS 108 can restore both the previous failure and the new failure.

In step 316, the OCCS controller 111 sends an alarm to a national network management center (NNMC) or other centralized or regional fault reporting center to report an unrestorable failure. If the new failure is a module failure, such as module failure 410 shown in FIG. 4C, and the previous failure is a module failure then two module failures have occurred but only one protect channel 212 is available for restoration. Assuming one protect channel is available and no other restoration technique can be used to in order to enable the optical cross connect 116 to restore the second module failure, the OCCS controller 111 sends an alarm to a fault reporting center such as the NNMC to report an unrestorable failure.

The NNMC has staff and computer systems to detect and restore failures that cannot be restored with the automated systems in the telecommunications network 122. Computer systems in the NNMC may provide restoration automatically by rerouting traffic using switching tables within exchanges, such as first exchange 104 and second exchange 118. If automated computer systems do not automatically provide reroutes, they may provide information to staff that manually implements changes to the software to reroute traffic. For example, if multiple faults occur on telecommunications cable 113 that cannot be restored, either computer systems or staff may modify the switch tables in first exchange 104 to send the traffic via different communications links until telecommunications cable 113 is repaired. However, if the failure is limited to one second module failure, the NNMC may do nothing or simply block traffic from attempting to use the channel 214C that cannot be restored until the channel 214C is repaired. Often all channels 214 within a telecommunications cable 113 are not in use so new calls can use the remaining channels 214A, 214B, ... 214n.

In step 318, the OCCS controller 111 sends a command to the first OCCS 108 to reroute the previous line failure 404. After the previous line failure 404 has been rerouted by the first OCCS 108, the OCCS controller 111 sends a command to the first LTE 106 to switch the electrical signals that were carried on the second failed channel 214C to the protect channel 212 to restore the new module failure 410.

If the OCCS controller 111 performs step 318, then in step 310, the OCCS controller 111 identified that the new failure was a module failure 410, and in step 314, the OCCS controller 111 retrieved information indicating that the previous failure was a line failure 404. As mentioned previously, the scenario of a previous first line failure 404 and a new module failure 410 is illustrated in FIG. 4C. If the optical cross connect 116 cannot restore single module failures via the optical restoration network 110, then the OCCS controller 111 can only restore the new module failure 410 using the protect channel 212. As a result, restoration by the OCCS controller 111 of both the first line failure 404 and the module failure 410 is possible only if the first line failure is rerouted to the optical restoration network 110 by sending an alarm to the first OCCS 108.

The OCCS controller 111 sends a command to the first OCCS 108 to reroute the previous first line failure 404 via the optical restoration network 110. The OCCS controller 111 may restore any number of line failures by sending alarms to the first OCCS 108 which will reroute the electric signals via the optical restoration network. In other words, if channels 214A, 214B, and 214D experience line failures prior to channel 214C experiencing a module failure, each line failure would have been restored by the OCCS controller 111 performing earlier steps in the operation of optical termination and cross connect equipment 301 when each failure was experienced. The result would be that the first line failure would be restored on the protect channel 212 by the OCCS controller 111 performing steps 304, 306, and 308 and subsequent line failures would be restored via the optical restoration network 110 by the OCCS controller 111 performing steps 306, 309, 310, and 312. However, regardless of the number of line failures restored via the optical restoration network 110, when a module failure 410 is detected, if a line failure 404 is restored on the protect channel 212, the line failure 404 is rerouted via the optical restoration network 110 to make the protect channel 212 available to restore the module failure 410. After the line failure 404 is restored by the first OCCS 108 via the optical restoration network, the first LTE 106 switches the electrical signals that were carried on channel 214C that experienced the module failure 410 to the protect channel 212.

Figure 5:
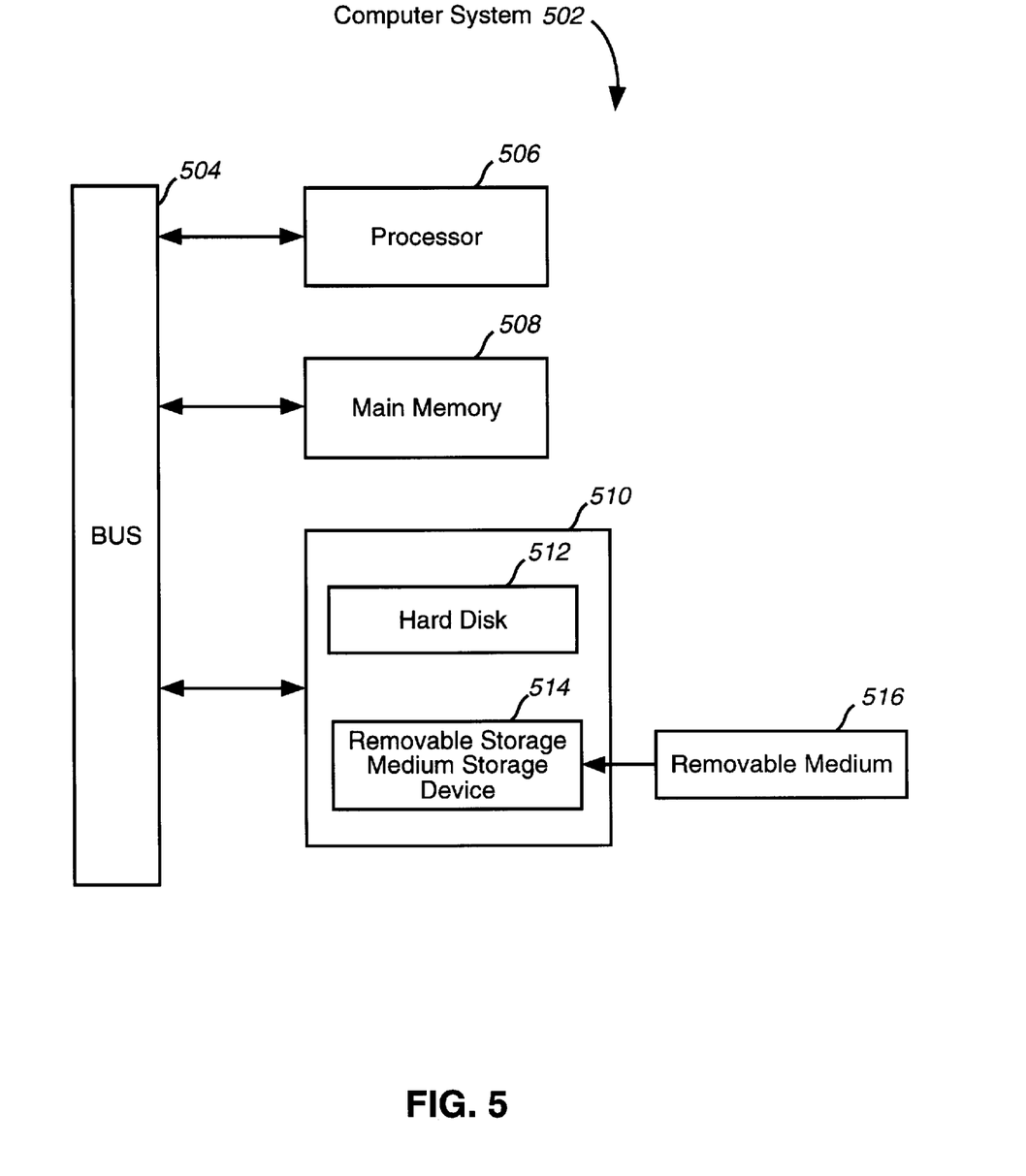
FIG. 5 is a block diagram of an optical cross connect switch controller according to one embodiment of the present invention.

The OCCS controller 111 of the present invention is preferably implemented using a computer system 502 as shown in block diagram form in FIG. 5. The computer system 502 includes one or more processors, such as processor 506 connected to bus 504. Also connected to bus 504 is main memory 508 (preferably random access memory, RAM) and secondary storage devices 510. The secondary storage devices 510 include, for example, a hard drive 512 and a removable storage medium drive 514 (such as a disk drive, for example).

The functionality of the OCCS controller 111 is preferably performed by a computer program that resides in main memory 508 while executing. When executing, this computer program enables the computer system 502 to perform the features of the present invention as discussed herein. Thus, the OCCS controller 111 represents a controller of the computer system 502 (and of the processor 506). Alternatively, the functionality of the OCCS controller 111 is predominately or entirely performed by a hardware device, such as a hardware state machine.

In one embodiment, the present invention is a computer program product (such as removable storage medium 516, representing a computer storage disk, compact disk, etc.) comprising a computer readable media having control logic recorded thereon. The control logic, when loaded into main memory 508 and executed by processor 506, enables the processor 506 to perform the operations described herein.

Although the OCCS controller 111 has been described with respect to an exemplary controller and processor, the OCCS controller 111 is not limited to this embodiment. The OCCS controller 111 controls the OCCSs. The OCCS controller 111 may be within an OCCS, such as first OCCS 108 and/or second OCCS 112. Alternatively, the OCCS controller 111 could be within another component within the telecommunications network such as first LTE 106 and/or second LTE 114. The OCCS controller 111 is any capability to control one or more OCCSs, such as first OCCS 108 and second OCCS 112.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What is claimed is:

1. A method of addressing a subsequent failure in a telecommunications network that has experienced one or more previous failures, comprising the steps of:
   (a) detecting the subsequent failure;
   (b) identifying a failed facility type that caused the subsequent failure;
   (c) determining whether a protect channel is restoring one of the one or more previous failures; and
   (d) when it is determined in step (c) that said protect channel is restoring one of the one or more previous failures, sending a notification of the subsequent failure to an optical cross connect switch controller;
   wherein said notification includes said failed facility type that caused the subsequent failure.

2. A method of addressing a subsequent failure in a telecommunications network that has experienced one or more previous failures, comprising the steps of:
   (a) receiving a notification of the subsequent failure, wherein said notification includes a failed facility type that caused the subsequent failure;
   (b) determining whether the subsequent failure is restorable via an optical cross connect switch; and
   (c) addressing the subsequent failure.

3. The method of claim 2, wherein step (b) comprises the steps of:
   (i) determining whether said failed facility type received in said notification of the subsequent failure is a line failure; and
   (ii) if it is determined in step (i) that said failed facility type is said line failure, determining that the subsequent failure is restorable via said optical cross connect switch.

4. The method of claim 2, wherein step (b) comprises the steps of:
   (i) determining whether said failed facility type received in said notification of the subsequent failure is a module failure;
   (ii) if it is determined in step (i) that said facility type is said module failure, determining a previous failed facility type of one of the one or more previous failures that is restored on a protect channel; and
   (iii) if it is determined in step (ii) that said previous failed facility type is a line failure, determining that the subsequent failure is restorable via said protect channel.

5. The method of claim 2, wherein step (b) comprises the steps of:
   (i) determining whether said failed facility type received in said notification of the subsequent failure is a module failure;
   (ii) if it is determined in step (i) that said facility type is said module failure, determining a previous failed facility type of one of the one or more previous failures that is restored on one of one or more protect channels;

(iii) if it is determined in step (ii) that said previous failed facility type is said module failure and additional previous failures are restored on additional protect channels, repeat step (ii) to determine another previous failed facility type for another one of the one or more previous failures that is restored via another one of the one or more protect channels; and (iv) if it is determined in step (iii) that said another previous failed facility type is a line failure, determining that the subsequent failure is restorable via said protect channel.

6. The method of claim 2, wherein step (b) comprises the steps of:

(i) determining whether said failed facility type received in said notification of the subsequent failure is a module failure;

(ii) if it is determined in step (i) that said facility type is said module failure, determining a previous failed facility type of one of the one or more previous failures that is restored on a protect channel;

(iii) if it is determined in step (ii) that said previous failed facility type is a module failure, determining that the subsequent failure is not restorable.

7. The method of claim 2, wherein step (b) comprises the steps of:

(i) determining whether said failed facility type received in said notification of the subsequent failure is a module failure;

(ii) if it is determined in step (i) that said facility type is said module failure, determining a previous failed facility type of one of the one or more previous failures that is restored on one of one or more protect channels;

(iii) if it is determined in step (ii) that said previous failed facility type is said module failure and additional previous failures are restored on additional protect channels, repeat step (ii) to determine another previous failed facility type for another one of the one or more previous failures that is restored via another one of the one or more protect channels; and (iv) if it is determined in step (iii) that said another previous failed facility type is said module failure, determining that the subsequent failure is not restorable.

8. The method of claim 2, wherein step (c) comprises the step of:

restoring the subsequent failure via said optical cross connect switch.

9. The method of claim 2, wherein step (c) comprises the steps of:

restoring one of the one or more previous failures that was restored on a protect channel via said optical cross connect switch; and restoring the subsequent failure via said protect channel.

10. The method of claim 2, wherein step (c) comprises the step of:

sending an alarm to a centralized network management center.

* * * * *